US011141650B2

(12) United States Patent
Green

(10) Patent No.: US 11,141,650 B2
(45) Date of Patent: Oct. 12, 2021

(54) SYSTEM FOR SIMULATING CONTROLS USING A SET OF CONNECTED ARTICULATED JOINTS MOUNTED UPON A MOTION SIMULATOR PLATFORM

(71) Applicant: Altered Mechanics, Westminster, CA (US)

(72) Inventor: David Green, Westminster, CA (US)

(73) Assignee: ALTERED MECHANICS, Westminster, CA (US)

( * ) Notice: Subject to any disclaimer, the term of this patent is extended or adjusted under 35 U.S.C. 154(b) by 140 days.

(21) Appl. No.: 16/680,949

(22) Filed: Nov. 12, 2019

(65) Prior Publication Data

US 2020/0147482 A1 May 14, 2020

Related U.S. Application Data

(60) Provisional application No. 62/760,744, filed on Nov. 13, 2018.

(51) Int. Cl.
    *A63F 13/211* (2014.01)
    *A63F 13/24* (2014.01)

(52) U.S. Cl.
    CPC ............ *A63F 13/211* (2014.09); *A63F 13/24* (2014.09)

(58) Field of Classification Search
    CPC .............................. A63F 13/211; A63F 13/24
    USPC .......................................................... 463/37
    See application file for complete search history.

(56) References Cited

U.S. PATENT DOCUMENTS

| 7,297,060 B2 * | 11/2007 | Brase | A47C 3/16 463/36 |
| 8,794,698 B2 * | 8/2014 | Halsey | A47C 7/68 297/153 |
| 2005/0130742 A1 * | 6/2005 | Feldman | A63B 21/0023 463/39 |
| 2009/0256800 A1 * | 10/2009 | Kaufman | G06F 3/011 345/156 |

* cited by examiner

*Primary Examiner* — Allen Chan
(74) *Attorney, Agent, or Firm* — Kenyon Jenckes

(57) ABSTRACT

A system including of a set of connected articulated joints are mounted to a motion simulator, which are controlled at one end by an operator with their hands. This system of connected articulated joints gives the operator the sensation of operating a mechanical or nonmechanical device, when counterbalanced reducing fatigue of moving controls freely for sustained periods of time.

8 Claims, 5 Drawing Sheets

SYSTEM FOR SIMULATING CONTROLS USING A SET OF CONNECTED ARTICULATED JOINTS MOUNTED UPON A MOTION SIMULATOR PLATFORM

CROSS-REFERENCE TO RELATED APPLICATIONS

This Application claims priority to Provisional Patent Application Ser. No. 62/760,744, filed Nov. 13, 2018, and entitled NOVEL SYSTEM FOR SIMULATING CONTROLS USING A SET OF CONNECTED ARTICULATED JOINTS MOUNTED UPON A MOTION SIMULATOR PLATFORM.

FIELD OF THE INVENTION

The present disclosure relates to a system for proprioception in a computerized virtual environment, e.g., a gaming environment, and more particularly to a system for simulating controls using a set of connected articulated joints mounted upon a motion simulator platform.

BACKGROUND

Motion simulators in a computer gaming environment that require a controller device for an operator to use typically utilize a fixed position where the controller, yoke or other device for input is located upon that motion simulator.

For most virtual simulations this is acceptable, however where virtual simulations require a more fluid and free position for the controller this may lead to a lack of an immersion experience for the operator, as the virtual simulation does not match the interaction being performed with the controller in the fixed position upon the motion simulator.

For example, when moving, say, a robot's arm in a virtual simulation using a joystick at a fixed position upon the motion simulator, the arm will move with the commands from the joystick, but the operator will feel a disconnect with the virtual simulation, as there is no proprioception, or kinesthetic sense, of moving an actual arm of a relatively solid or heavy arm-type structure.

Accordingly, it would be desirable to provide a system in which the position controls in a virtual world by using a freely moving controller in the real world, while utilizing a motion simulator to provide a better immersion experience for the user.

SUMMARY

Aspects of the present invention provide a system which includes a set of connected articulated joints that are mounted to a motion simulator, which are controlled at one end by an operator with their hands. This system of connected articulated joints performs two roles for the operator, giving them the sensation of operating virtual mechanical or nonmechanical, e.g., biological avatar, arm-type structure(s) in a virtual world, and secondly when counterbalanced reducing fatigue of moving controls freely (not fixed in place upon the motion simulator) for sustained periods of time.

This system when combined with monitors or a visual device (such as but not limited to a virtual reality headset), can give a more immersive simulation for the operator. For example this could be used, but is not limited to, a simulation in a virtual world where an operator is performing arm actions while driving a robot. The invention would give the user the impression of actually performing the tasks in a more immersive manner because of the one-to-one representation of the physical control point and virtual arm point of the robot.

The system may be mounted to a motion simulator platform which simulates the motion within the virtual world's simulation the operator is currently within. This motion platform could be, but is not limited to, a seated experience. The set of connected articulated joints could be connected to a different motion platform, for example, but not limited to, a platform where the operator is standing up or laying down.

DETAILED DESCRIPTION

In an embodiment, the apparatus and systems described allow a user, or operator, in a computer generated virtuality to move a controller freely to a representative/exact location of, e.g., a robot arm in the virtual world.

The apparatus includes a set of connected articulated joints which may be mounted to a motion simulator and controlled at one end by an operator with their hands. This system of connected articulated joints performs two roles for the operator, giving them the kinestheic sensation of operating a virtual mechanical or nonmechanical, e.g., biological, limb in a virtual world, and secondly when counterbalanced, reducing fatigue of moving controls freely (i.e., not fixed in place upon the motion simulator) for sustained periods of time.

When combined with monitors or a visual device (such as but not limited to a virtual reality headset), the apparatus can give a more immersive simulation for the operator. For example this could be used, but is not limited to, a simulation in a virtual world where an operator is performing arm actions while driving a robot. The invention would give the user the impression of actually performing the tasks in a more immersive manner, including proprioception, e.g., the kinesthetic sense of moving a relatively solid and/or heavy object, than without the system because of the one-to-one representation of the physical control point and virtual arm point of the robot.

Figure 1:
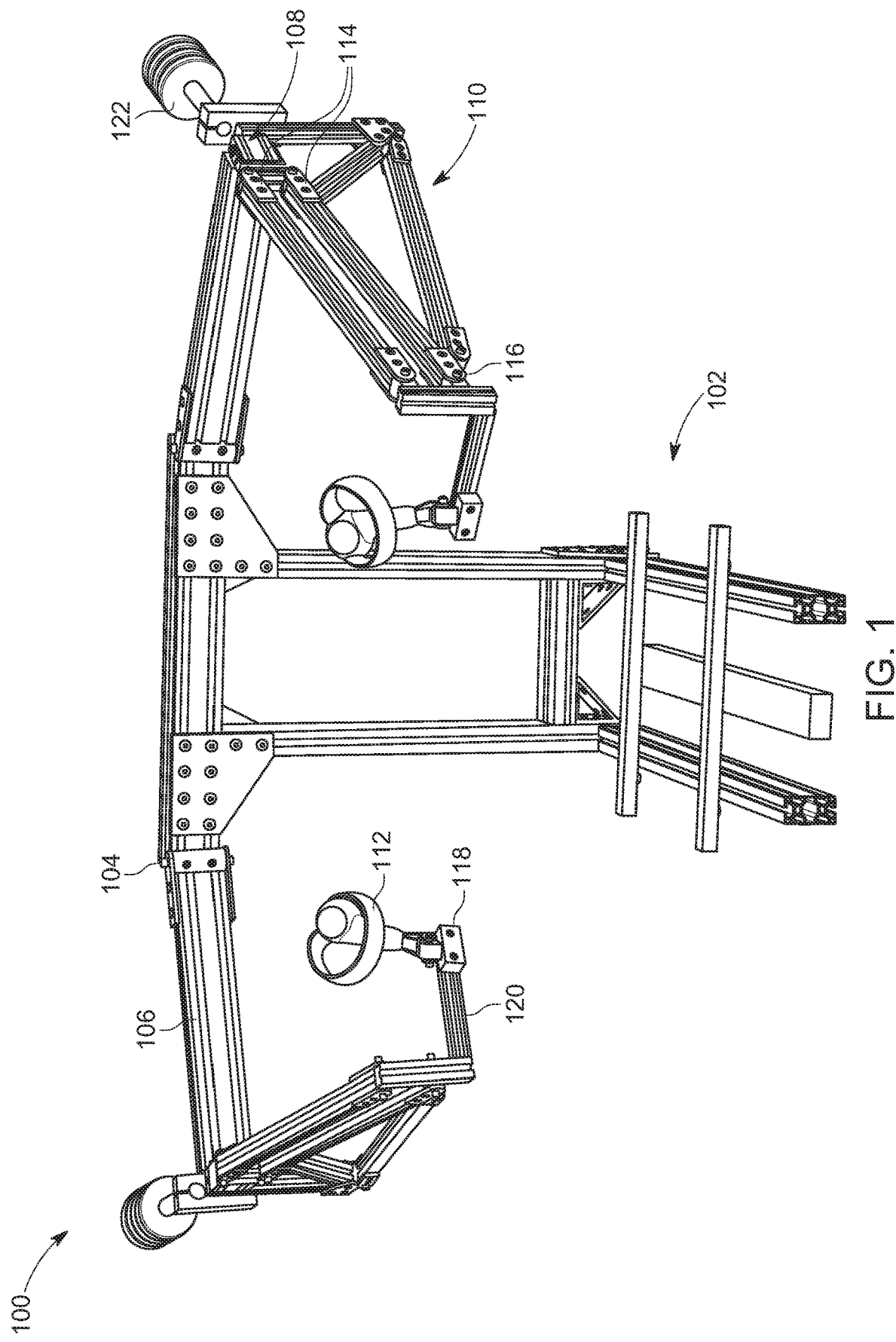
FIG. 1 is a perspective view of a system for simulating controls using a set of connected articulated joints on a motion simulator platform according to an embodiment.

As shown in FIG. 1, the apparatus 100 may be mounted to a base 102, e.g., a motion simulator platform which simulates the motion within the virtual world's simulation the operator is currently within. This motion platform could be, but is not limited to, a seated experience for the configuration shown in the figures. The set of connected articulated joints could be connected to a different motion platform, for example, but not limited to, a platform where the operator is standing up or laying down.

A first joint 104 between the base 102 and the upper arm 106 acts as a rotational element around the up axis (in relation to the base orientation). It provides movement of the set of connected articulated joints towards and away from the operators body horizontally.

A second joint 108 between the upper arm 106 and the forearm 110 acts as a rotational element around the up axis. It enables the set of connected articulated joints to not be limited by the operators own limb length and provides movement of the articulated arm towards and away from the users body horizontally.

The first joint 104 and second joint 108 can be used in conjunction to allow complete freedom of motion in the horizontal plane, thereby enabling positioning of the control point (where a controller 112 is positioned) towards and away from the operators chest.

A third set of joints 114 located at the point where the upper arm 106 and the forearm 110 meet which allows the set of connected articulated joints to move the controller 112 up and down in a vertical direction away and towards the lap of the operator, thereby allowing complete freedom of the translation motion of the control point in three dimensions.

The fourth set of joints 116 comprise the remaining joints in the forearm 110. This set of joints constrain the controller 112 in a horizontal attitude no matter the orientation of the first joint 104, second joint 108 and third joint 114 described above. This removes the angular displacement caused by vertical motion of the control point.

The fifth joint 118 is located between the controller 112 and a controller rod 120 and allows several degrees of freedom to remove the need for the operator to twist their wrist to maneuver the controller. This fifth joint 118 is for illustrative purposes only and may differ depending upon the differing controller attached to the controller rod 120.

To counter the weight of the operator limbs and set of connected articulated joints and their prolonged usage by the operator, which may lead to fatigue, a counterbalance system 122 may be added. This counterbalance 122 connects to the forearm 110 at the furthest point away from the controller rod 120 in order to perform an efficient counterbalance functionality.

The counterbalance 122 can be adjusted or removed entirely depending upon the virtual simulation. For instance the virtual simulation may want the operator to experience more or less fatigue while using the set of connected articulated joints. For example but not limited to, the virtual simulation of moving a mechanical arm may dictate that the operator get more fatigued for realism, which would be performed by removing more counterbalanced weight or overloading it.

The forearm 110 can be connected to the controller rod 120 and upper arm 106 via differing configurations although for illustrative purposes two rods are shown. These may act independently when the operator lifts or lowers the controller and enable the controller rod to stay at a horizontal level.

When used together the joints within the set of connected articulated joints allow the operator to move the controller point anywhere within the restriction that their arm can reach, while retaining the properties that allow the virtual simulation of a mechanical or nonmechanical, e.g., biological, control of an avatar in a virtual environment to seem more realistic and in turn more immersive for the operator.

The base 102 is the point at which the set of connected articulated joints connects to the motion simulator platform. Should that motion simulator platform change its orientation the base will orientate along with it leading to the set of connected articulated joints always being orientated in relation to the base. For example should the motion simulator platform roll fifteen degrees to the right, the base being connected will roll by the same amount, leading to the two upper arm joints that connect to the base to take on the fifteen degree tilt.

Figure 2:
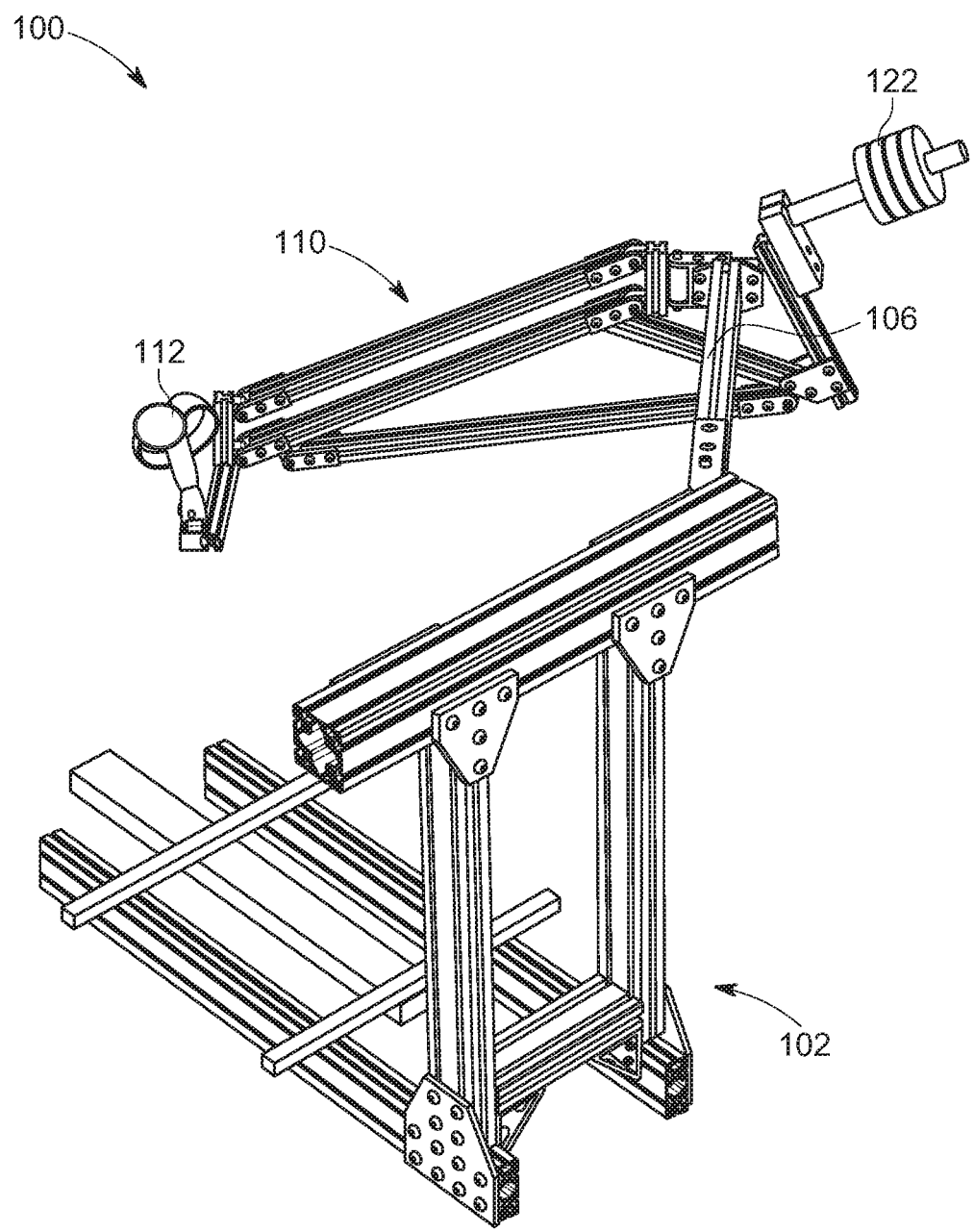
FIG. 2 shows a rear perspective view of the system shown in FIG. 1, in this case showing only one arm.
Figure 3:
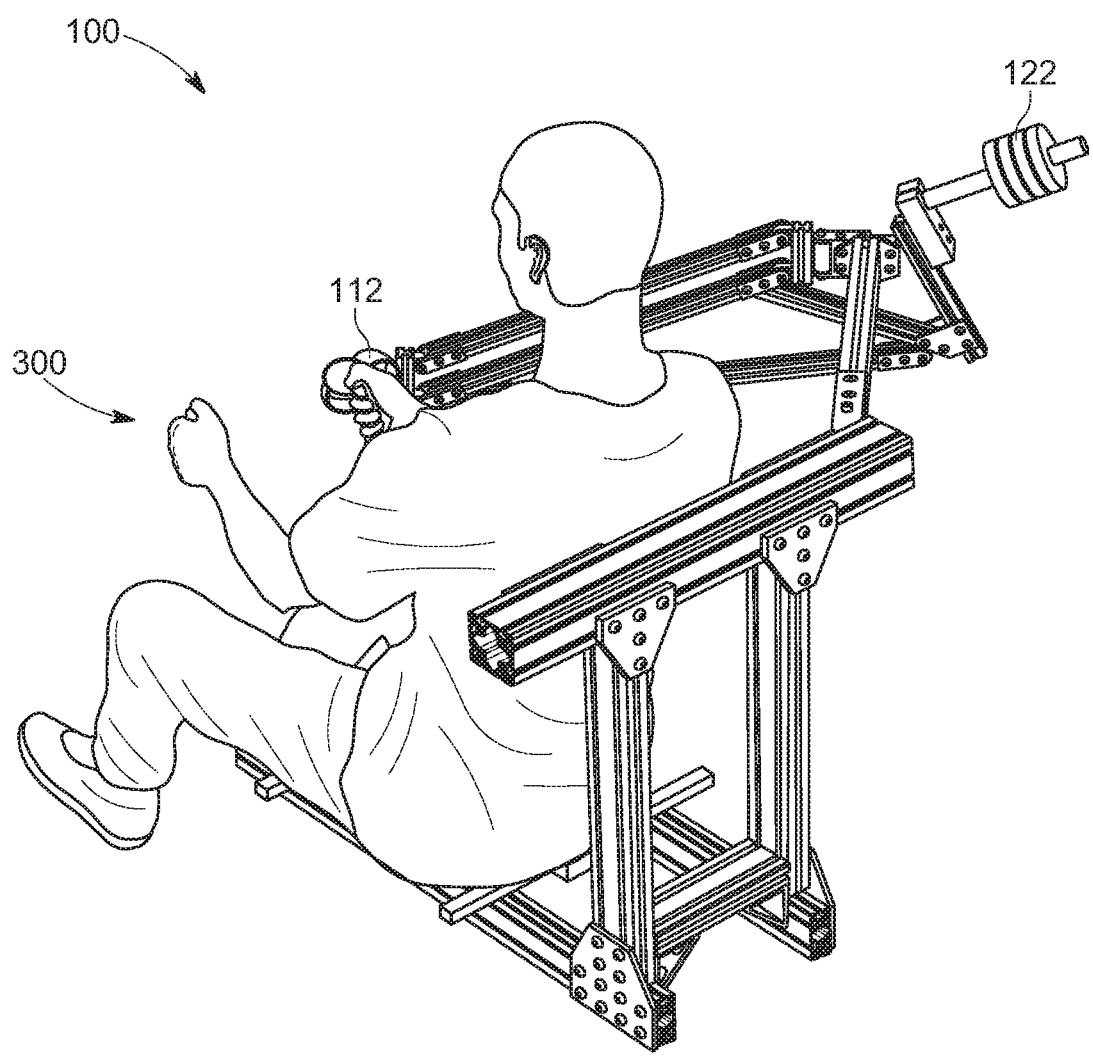
FIG. 3 shows the position an operator may use in interacting with the system of FIG. 1.
Figure 4:
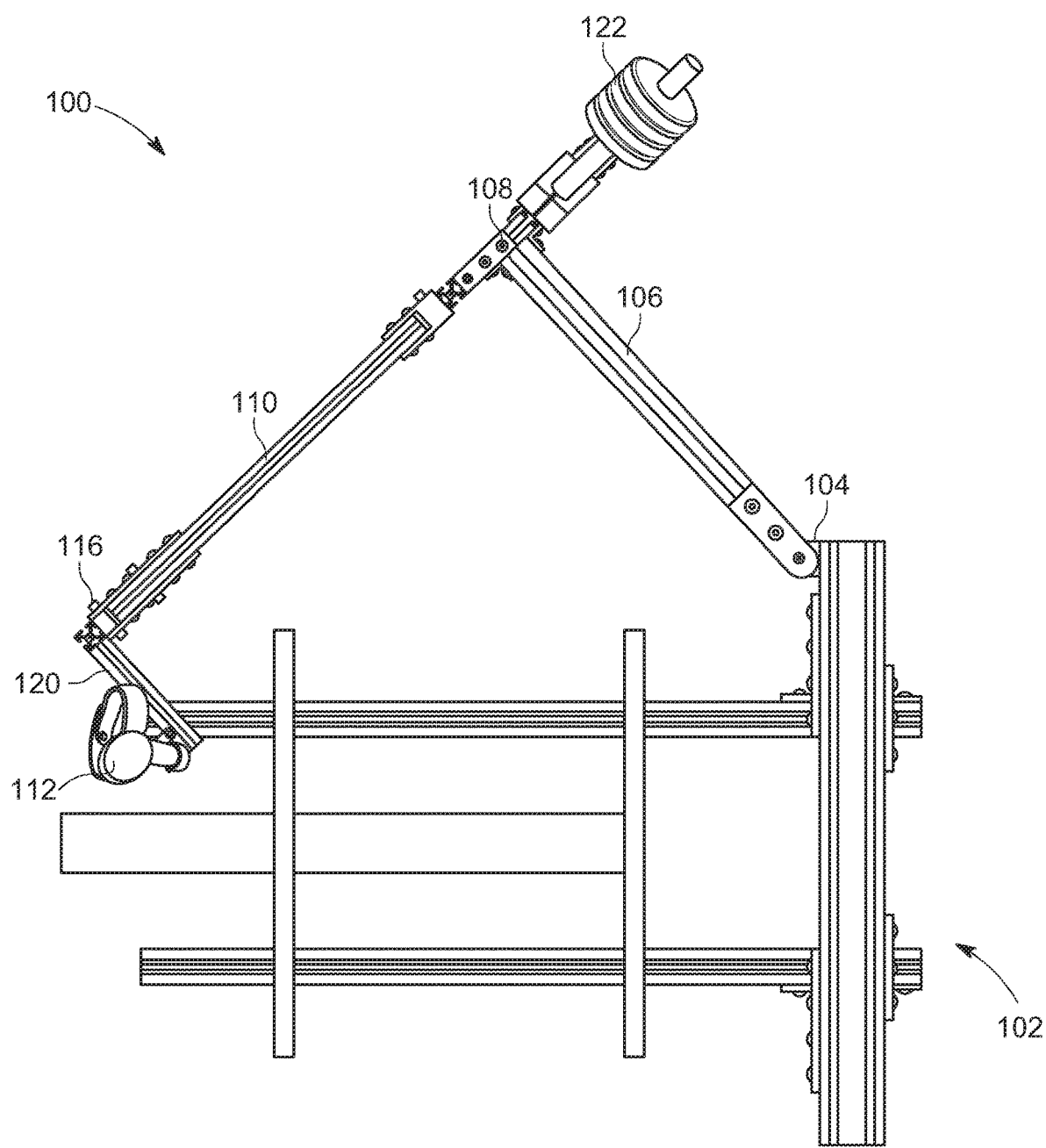
FIG. 4 is a top view of the system shown in of FIG. 1.

FIGS. 2 and 3 show the upper arm 106 and forearm 110 in a position in which the controller is pulled to the operator's 300 chest, which may be a more or less horizontal position. FIG. 4 is a top view of the upper arm 106 and forearm 110 in the same positions.

Figure 5:
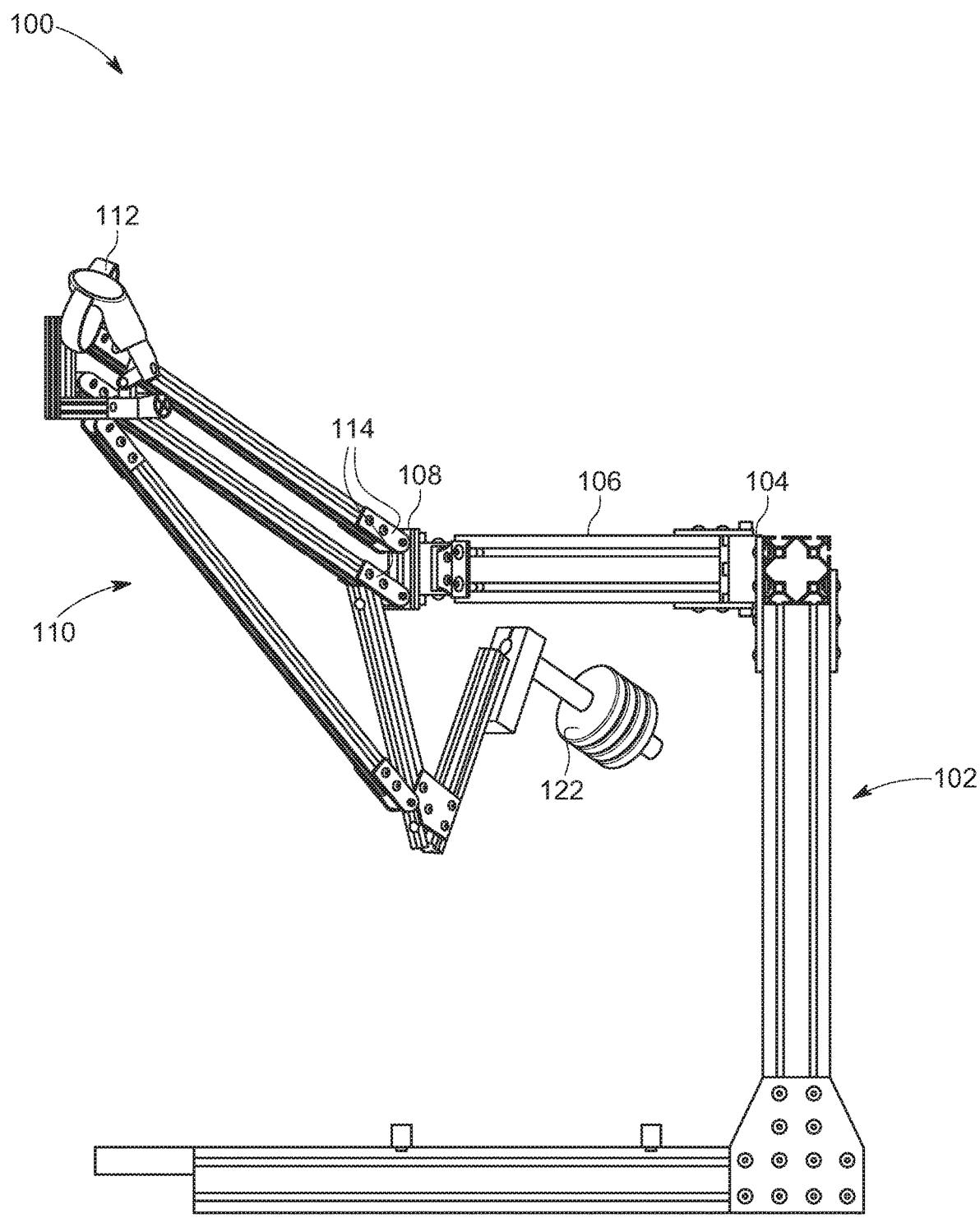
FIG. 5 is a side view of the system shown in FIG. 1, with the arms in a raised position.

FIG. 5, in contrast, shows a side view of the system 100 in which the articulated joints enable operator 300 to move the controller 112 vertically, e.g., above the operator's head.

The principal features of this invention may be employed in various embodiments without departing from the scope of the invention. For example, the upper arm and forearm of the apparatus may be made from different materials, e.g., metal or plastic, using different manufacturing techniques. The articulated joints may include a variety of different joint styles, either alone or in combination, e.g., hinge joint, ball-joint, ball bearing, etc. As described above, the base, or platform, may be designed for the user to use in a seated, standing, or prostrate position. The immersion with the system may be through a virtual reality (VR) interface, e.g., VR goggles, or other immersive experience, or a non-VR visualization, e.g., television or projection screen.

The specific embodiments discussed herein are merely illustrative of specific ways to make and use the invention and do not delimit the scope of the invention.

The invention claimed is:

1. A motion interface system comprising:
  a base;
  an upper arm portion having a first end attached to the base and a second end;
  a forearm portion having a first end attached to the second end of the upper arm portion and a second end;
  a controller receptacle connected to the second end of the forearm portion;
  a hand-operated controller connected to the controller receptacle; and
  a plurality of joints connected between the base, the upper arm portion, the forearm portion, and the controller receptacle, wherein the set of joints can be manipulated in translation of the movements of an operator.

2. The motion interface system of claim 1, wherein said base is capable of moving said operator with respect to the stationary physical environment.

3. The motion interface system of claim 1, further comprising a counterbalance system for compensating the effect of gravity on the motion of the plurality of joints manipulated by said operator.

4. The motion interface system, wherein the plurality of joints comprises a first joint connecting the upper arm portion to the base to control the upper arm on a horizontal axis.

5. The motion interface system, wherein the plurality of joints comprises a second joint connecting the upper arm portion to the forearm to control the forearm portion in a horizontal axis.

6. The motion interface system, wherein the plurality of joints comprises a third joint connected between the upper arm portion to the forearm portion to control the forearm portion in a vertical axis.

7. The motion interface system, wherein the plurality of joints comprises a fourth joint including a set of joints operative to constrain the controller in a horizontal attitude.

8. The motion interface system, wherein the plurality of joints comprises a fifth joint connected between the controller and the controller rod and operative to provide several degrees of freedom for the operator to maneuver the controller.

\* \* \* \* \*